June 1, 1937.  H. N. ENSIGN ET AL  2,082,328

TENSION DEVICE FOR FILM REELS

Filed May 9, 1936   2 Sheets-Sheet 1

Inventors
Harris N. Ensign,
Harry A. Hanson,
Attorney.

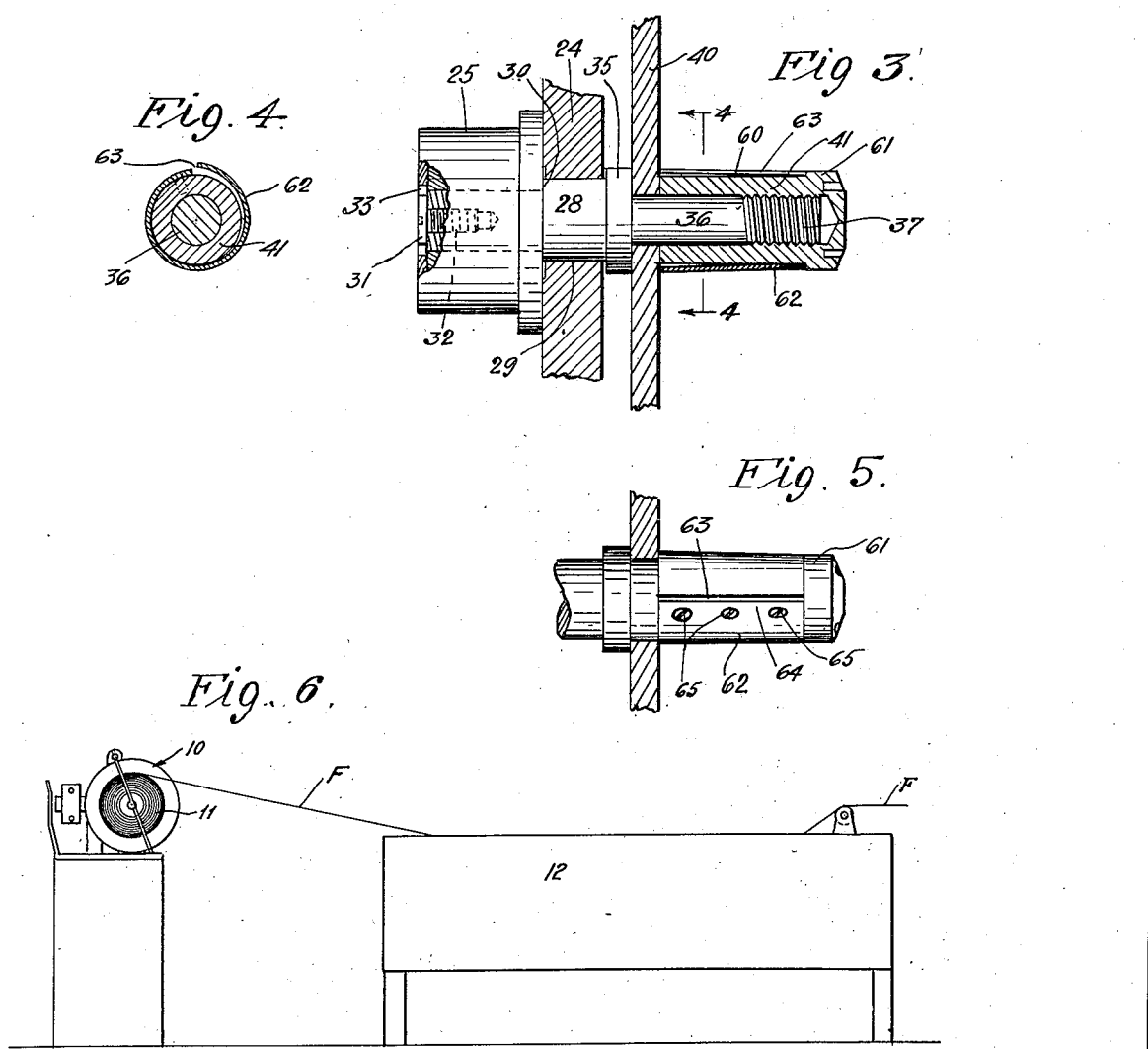

Patented June 1, 1937

2,082,328

UNITED STATES PATENT OFFICE 2,082,328

TENSION DEVICE FOR FILM REEL

Harris N. Ensign, Los Angeles, and Harry A. Hanson, West Los Angeles, Calif., assignors to Paramount Productions, Inc., Los Angeles, Calif., a corporation of Delaware Application May 9, 1936, Serial No. 78,882

1 Claim. (Cl. 242—75)

This invention relates generally to tension devices for motion picture film reels, and has for its general object to provide a film supply reel mechanism adapted to exert a substantially uniform hold-back effect on the film strip being unwound therefrom.

As a film strip is passed from a reel, for instance to the ingoing end of a developing machine, its tension increases as the radius of the film roll decreases, this effect being due to the decreasing effective lever arm of pull of the film on the reel. The device of the present invention is designed to compensate to a large extent such increase in tension as the film is fed. The improved device involves a film roll carrying spindle journaled in the end of a swinging arm, said spindle carrying a friction disc, of diameter larger than the film roll, which bears at its lower edge against a suitable smooth surface. The pressure of the disc on this surface at any given time, and therefore the hold-back imposed on the disc, then depends upon the weight of the film roll at that time. As the film roll decreases in size, the tendency for film tension to increase because of decrease in lever arm of pull of the film on the reel is thus counteracted by the decreasing pressure of the friction disc on the hold-back surface due to lessening weight of the film roll. The device thus exerts a tension on the film going from the reel which is sufficiently uniform for many practical purposes, such as feeding film to the developing machines, the device exerting a sufficient frictional hold-back effect to prevent the reel from running ahead during operation, while at no time exerting substantially more than sufficient tension to hold the film strip suitably taut.

It is a further object of the invention to provide an improved film spool device adapted for use with a film reel as of the instant type, which is characterized by simplicity and ease of mounting and de-mounting a film roll thereon.

The invention in all its aspects will be more fully understood from the following detailed description of a present preferred embodiment thereof, reference for this purpose being had to the accompanying drawings, in which:

Fig. 3 is a vertical detail section taken on line 3—3 of Fig. 1;

Fig. 4 is a detail cross section taken on line 4—4 of Fig. 3;

Fig. 5 is a detail elevation looking downwardly on the film spool device shown in Fig. 3; and Fig. 6 is a general view showing the film supply reel device of the present invention feeding film to a conventionally illustrated developing machine unit.

Figure 2:
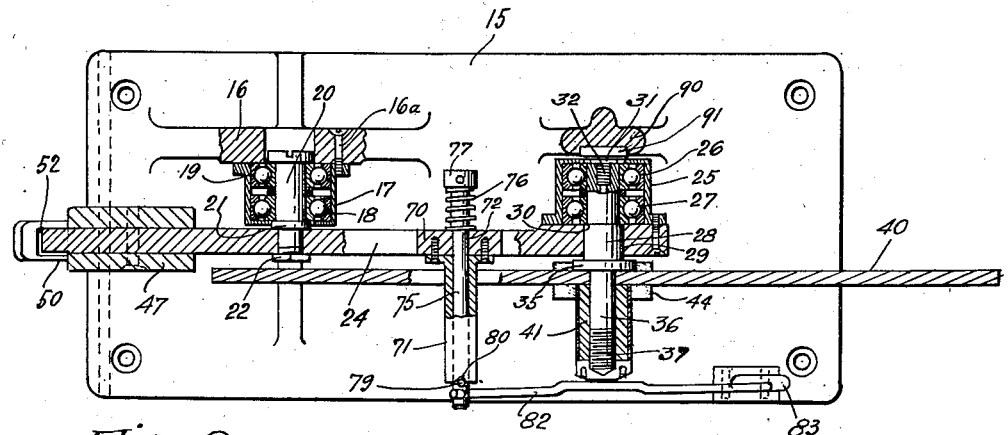
Fig. 2 is a section taken on broken line 2—2 of Fig. 1.
Figure 1:
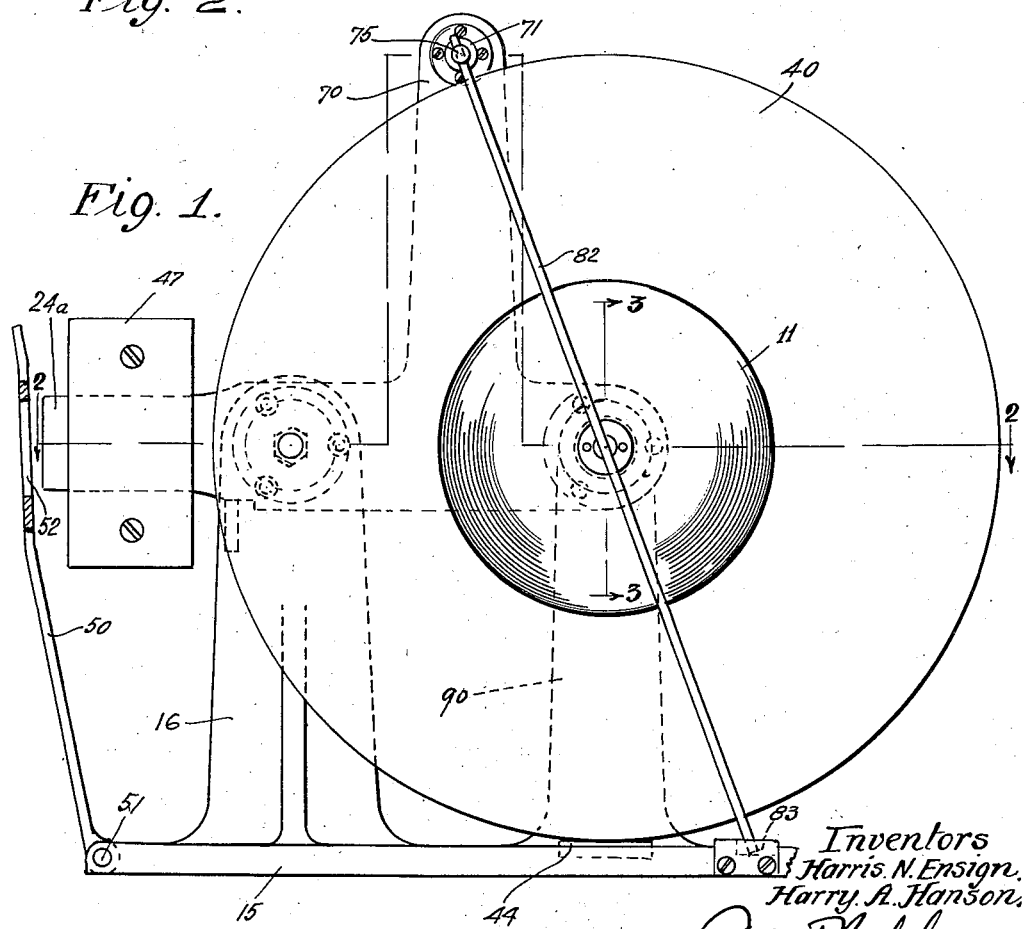
Fig. 1 is a side elevation of the film supply reel device of the present invention.

In Fig. 6 of the drawings the reel device 10 of the present invention is shown carrying a film roll 11, from which film strip F passes into developing tank 12, the developing tank being understood to be equipped with film driving devices acting to draw the film from the reel device 10.

The device 10 is provided with a suitable base 15, adapted to rest on any suitable horizontal support, base 15 being provided with a standard 16 to the upper end of which is fastened, as by screws 16a, a bearing case or housing 17 carrying bearings 18 and 19 for a horizontally disposed rotatable shaft 20. Mounted on one end of shaft 20, between a flange 21 integral with the shaft and a nut 22 screwthreaded on its end, is a swinging reel-carrying arm 24.

Mounted on the forward end of swinging arm 24 is a cylindric bearing case 25 carrying spaced ball bearings 26 and 27 for a horizontally disposed rotatable shaft or spindle 28, said spindle passing loosely through a bore 29 formed in the forward end of arm 24 concentric with cylindric bearing case 25. Spindle 28 is positioned axially by engagement of annular shoulder 30 against the inner race ring of ball bearing assembly 27, together with engagement against the inner race ring of ball bearing assembly 26 by the head 31 of a flat headed screw 32 screwed in the end of shaft 28. The end of bearing case 25 is provided with a circular aperture 33 to enable screw 32 to be set into the spindle. On the other side of arm 24, spindle 28 has a flange 35, and beyond flange 35 a reduced portion 36, the extremity of which is screwthreaded, as at 37.

Mounted on spindle portion 36, against flange 35, is a large circular disc 40, which is formed of some suitable material such as canvas bakelite. A cylindrical film hub 41 is screwed onto shaft portion 36, with its inner end in tight engagement with disc 40, so as to clamp the disk against relative rotation on spindle 36.

The periphery of disc 40 bears at the bottom on a smooth-surfaced inset 44 in base 15. This inset 44 has a smooth upper surface, and is of some material such as will not impose an undue degree of frictional hold-back to rotation of friction disc 40. A small glass plate having a smooth upper surface is suitable for the purpose.

The rearward end of reel carrying arm 24 is provided with a counter-weight 47, which counterbalances a large proportion, though not all, of the weight of the reel and film roll carried by the other end of the arm.

In order to provide for a free running reel, as in the event no hold-back tendency on the unwinding film should be desired for certain operations, means are provided for supporting the reel carrying arm in a position with friction disc 40 elevated slightly above plate 44. For instance, there is here shown for such purpose an arm 50 pivoted at its lower end to one end of base 15, as at 51, and provided near its upper end with a slot 52 adapted to receive the rear end part 24a of reel carrying arm 24, when said arm is tilted to a position with the disc 40 elevated above plate 44. Thus, the forward end of arm 24 and the disc 40 carried thereby may be slightly elevated and the slot in the upper end of arm 50 hooked over rearward rear part 24a of arm 24, the device then being supported in a position in which the periphery of disc 40 clears plate 44, and therefore permitting the film roll to run perfectly free.

A contractible film spool is preferably used on the device, enabling the film roll to be easily mounted and demounted. The previously mentioned hub 41 mounted on spindle 36 is formed with a cylindrical surface 60, and with a slightly enlarged head 61 forwardly of surface 60. Encircling surface 60 is a spring brass sleeve 62, split longitudinally as at 63. This sleeve 62 is fastened along its edge 64 to hub 41, as by screws 65 (see Fig. 5). The other edge of the spring sleeve is left unfastened. The thickness of this sleeve is substantially equal to the depth of hub surface 60 below the periphery of head 61, so that the exterior surface of sleeve 62 is flush with the peripheral surface of head 61 when the sleeve is contracted about the hub. Sleeve 62 is somewhat conical shaped, its outer end normally fitting tightly about cylindrical surface 60, and being flush with the periphery of head 61, and its inner end standing normally in a slightly expanded position (Fig. 3). The film roll is brought to the device so wound that its inside film convolution is of such diameter that sleeve 62 will be compressed as the roll is forced over it. The film roll, thus forced onto sleeve 62, is then given a twist in a right-handed direction, which causes sleeve 62 to expand slightly, thereby binding the roll tightly on the hub. When the roll is to be removed from the hub, it is simply given a short turn to the left relatively to the hub, whereupon the sleeve 62 is caused to contract, and the roll may then be easily slipped off the hub.

Guide means are provided for preventing the film from running off the roll during operation. The forward end of reel carrying arm 24 is provided with an upwardly extending arm 70, to the upper end of which is secured a horizontally disposed bearing sleeve 71 which overlies friction disc 40. Journaled in this sleeve 71 and extending through a bore 72 in arm 70 is a shaft 75. A spring 76 acting between a head 77 on the rearward end of shaft 75 and the opposed surface of arm 70 tends to move shaft 75 in a rearward direction through sleeve 71, and such movement is prevented by engagement of pin 79 set into the forward end of shaft 75 with the forward end of sleeve 71. Preferably, pin receiving notches, such as 80, are provided in the forward end of sleeve 71 to establish certain positions of shaft 75. Carried by the forward end of shaft 75 is a film guiding rod 82, which is adapted to extend diametrically across the outer side of the film roll on the film hub, as shown. The lower end of rod 82 is received in a confining slot 83 provided in base 15 when the rod is in the film retaining position illustrated. When a film roll is to be placed on or removed from the film hub, rod 82 is swung upwardly from the position illustrated to give the necessary clearance.

To steady arm 24 while a roll of film is being forced onto film hub 41, there is preferably a standard 90 extending upwardly from base 15, said standard carrying an abutment plate 91 located immediately adjacent and to the rear of the rearward end of film hub spindle 28. When the film roll is forced onto the film hub, arm 24 flexes slightly until the end of shaft 28 engages abutment 91, which then braces the device as the film roll is forced the rest of the way onto the hub.

Assuming a film roll to be mounted on the film hub, the operation of the device is as follows: If it is desired to unwind the film without frictional hold-back, the reel-carrying end of arm 24 is slightly elevated and hold-down arm 50 is hooked over its rearward end, whereupon friction disc 40 slightly clears plate 44, and the device is in free running condition. For normal operation, with a degree of frictional hold-back imposed on the unwinding film, hold-down arm 50 is unhooked from an arm 24, and friction disc 40 allowed to rest down on plate 44. The friction between the periphery of disc 40 and plate 44 then affords a degree of hold-back, and assures a certain tension in the film strip leading from the film roll to the developing machine. The extent of this hold-back of course depends upon the frictional resistance between disc 40 and plate 44, and therefore upon the pressure with which disc 40 bears downwardly on said plate. This frictional resistance is accordingly at a maximum, when the film roll is of full size, and decreases as the roll is unwound, due to decreasing weight of the roll. At the same time, the effective lever arm of the film strip pulling on the roll is decreasing, because of the lessening diameter of the roll, which has a compensating effect on the decreasing film tension caused by decreasing weight of the unwinding roll.

A typical and preferred illustrative embodiment of the invention has now been described in some detail; it will be understood, however, that various modifications are possible without departing from the spirit and scope of the invention, and are contemplated within the meaning of the following claim.

We claim:

In a device of the character described, the combination of a support, a swinging arm horizontally pivoted on said support, a horizontal shaft journalled at one end in the swinging end of said arm, a friction disc rigidly mounted on said shaft adjacent said arm, a film hub on said shaft outside said disc adapted to receive a film roll, a supporting surface below said disc adapted to be frictionally engaged by the periphery of the disc and to support the disc in a position with the swinging arm in a substantially horizontally extending position, a counterbalance for said swinging arm designed to counterbalance a portion of the weight of said arm and film roll carried thereby, and releasable means for supporting the swinging arm in a position in which the friction disc clears the supporting surface.

HARRIS N. ENSIGN.
HARRY A. HANSON.